United States Patent [19]

Chin et al.

[11] Patent Number: 5,166,691
[45] Date of Patent: Nov. 24, 1992

[54] AUTOMATED MULTIBAND RADAR TEST SYSTEM

[75] Inventors: Moshing P. Chin, Los Angeles; Douglas N. Schwartz, Torrance, both of Calif.

[73] Assignee: Hughes Aircraft Company, Los Angeles, Calif.

[21] Appl. No.: 776,137

[22] Filed: Oct. 15, 1991

[51] Int. Cl.[5] ............................................. G01S 7/40
[52] U.S. Cl. ..................................................... 342/165
[58] Field of Search ................................. 342/165, 169

[56] References Cited

U.S. PATENT DOCUMENTS

| | | | |
|---|---|---|---|
| 3,646,554 | 2/1972 | Fierston et al. | 342/169 X |
| 4,730,191 | 3/1988 | Groebke | 342/169 |
| 4,737,792 | 4/1988 | Grome | 342/169 |

Primary Examiner—T. H. Tubbesing
Attorney, Agent, or Firm—Michael W. Sales; Wanda K. Denson-Low

[57] ABSTRACT

A versatile, reconfigurable automated radar test system. The invention (200) includes a system controller (212) for providing a plurality of digital control signals. Circuitry (232, 234, 236) is provided for converting the digital control signals to static analog and digital test signals. In addition, a function generator (240) is included for generating a plurality of dynamic analog and digital test signals. An interfacing arrangement (239, 242) is included for applying the static and dynamic analog and digital test signals to a module (12) of a radar system (10) under test.

14 Claims, 3 Drawing Sheets

AUTOMATED MULTIBAND RADAR TEST SYSTEM

BACKGROUND OF THE INVENTION

1. Field of the Invention

The present invention relates to radar systems. More specifically, the present invention relates to test apparatus for radar systems.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

2. Description of the Related Art

Radar systems are currently quite sophisticated. A modern radar system may consist of numerous analog and digital circuits and subsystems arranged in functional modules in accordance with several design constraints and considerations. As higher levels of integration are achieved with each module, new and more sophisticated modules are required to keep pace with an ever increasing rate of technological development in this area. A considerable design and manufacturing cost is associated with these modules which is exacerbated by the fact that a radar system manufacturer may manufacture several systems and interchangeable modules for same.

As each radar system must be tested extensively, each module must be tested. Indeed, testing of a conventional radar system may require that several tests be run on numerous modules. For example, in a typical RF electronics module, one might conduct analog tests for gain and for proper operation of the attenuation controls, proper operation of the filters, adjacent signal discrimination, and so on. In an IF electronics module, numerous tests may be conducted in the analog and digital domains for downconversion accuracy and for several controls. In a transmitter driver module, numerous tests may be conducted in the digital domain for timing parameters. In an RF processor, tests may be conducted similar to those conducted in the RF electronics module with the exceptions that the tests would be at higher power levels and more switching would be involved. In a reference oscillator module and a local generator module, signal purity and noise level tests may be conducted.

Currently, to test a module, a test set must be designed specifically for each module. Changes in the design of the module or in the tests conducted on the module may necessitate a partial or complete redesign of the test set. The costs associated with the redesign of custom radar system test sets is considerable.

Accordingly, there is a need in the art for a versatile, reconfigurable radar system test set capable of conducting a wide variety of tests on a variety of modules.

SUMMARY OF THE INVENTION

The need in the art is addressed by the automated radar test system of the present invention. The invention includes a system controller for providing a plurality of digital control signals in accordance with a versatile, reconfigurable testing regime adapted for a module under test. In a specific implementation, the controller would be a computer running a testing program. In the preferred embodiment, the digital control signals are converted to static analog and digital test signals. A function generator provides a plurality of dynamic analog and digital test signals in accordance with the testing regime. An interfacing arrangement is included for applying the static and dynamic analog and digital test signals to a module of a radar system under test. The interfacing arrangement provides appropriate physical interfaces for a given test on a selected module.

Thus, the present invention provides a versatile, reconfigurable automatic radar system test system.

DESCRIPTION OF THE INVENTION

Illustrative embodiments and exemplary applications will now be described with reference to the accompanying drawings to disclose the advantageous teachings of the present invention.

Figure 1A:
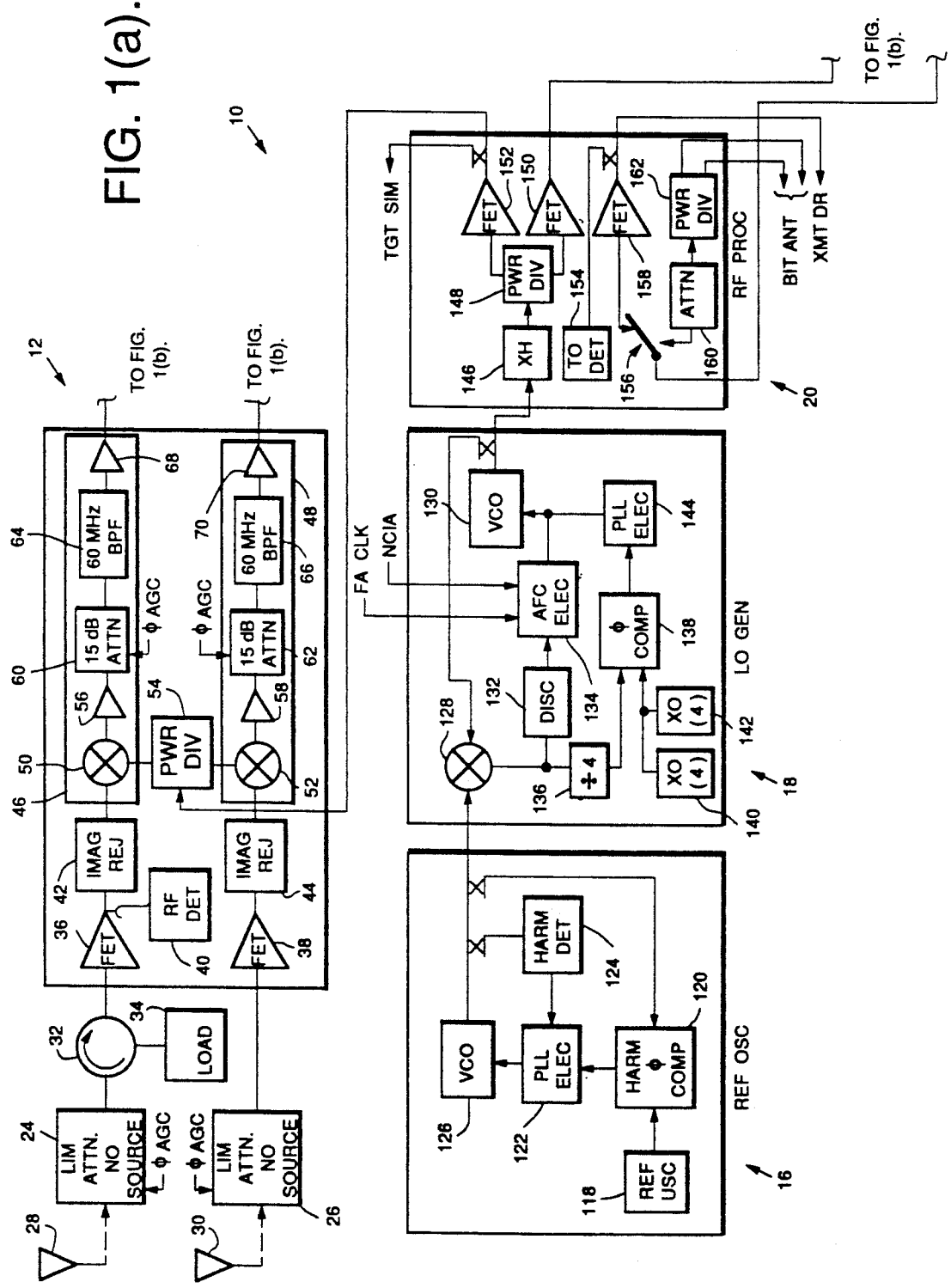
FIGS. 1(a) and (b) provide a simplified block diagram of a receiver/exciter unit of a typical conventional radar system under test.
Figure 1B:
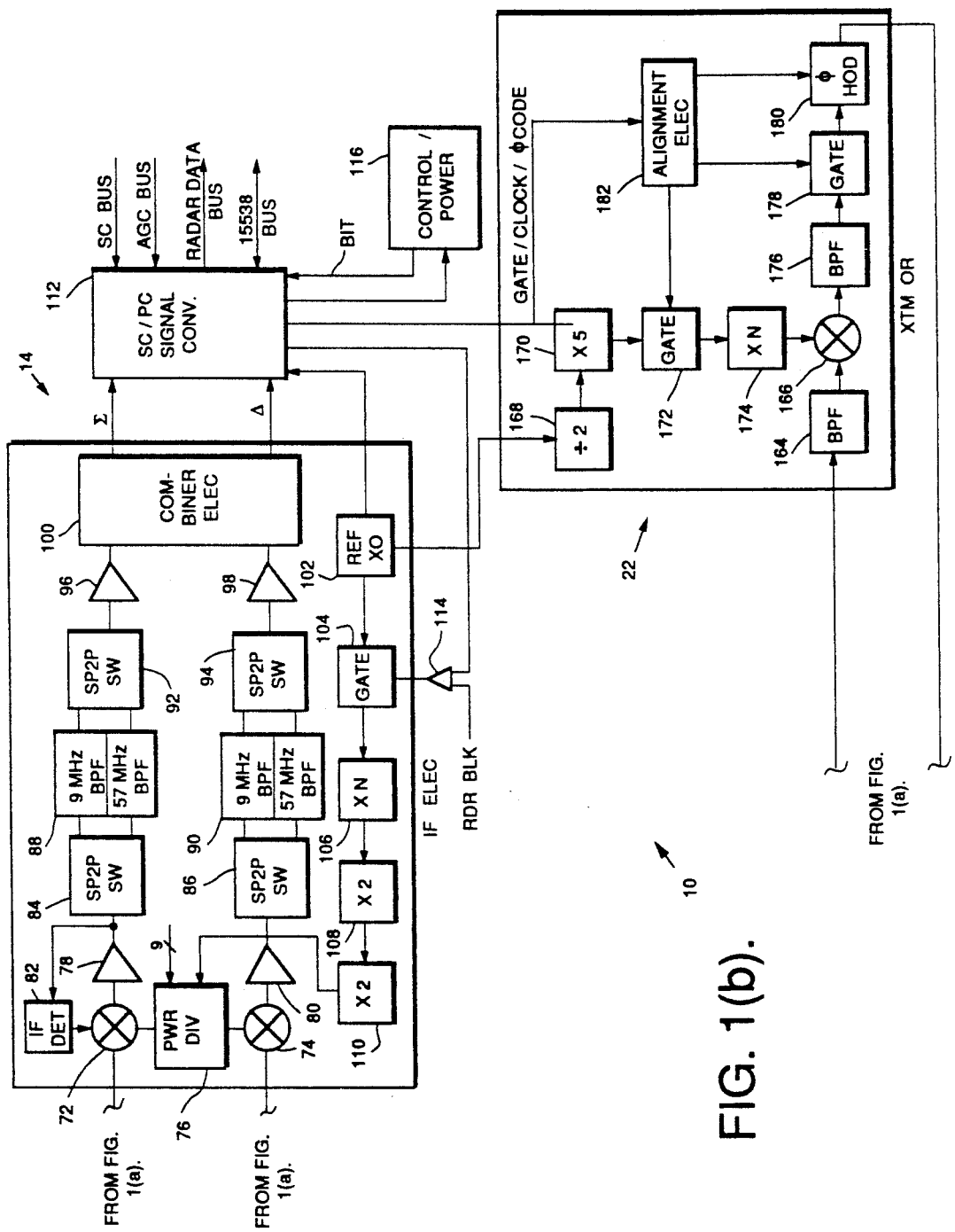

FIG. 1 is a simplified block diagram of a receiver/exciter subsystem 10 of a typical conventional radar system under test. The system 10 performs the RF processing function only. Those skilled in the art will appreciate that a complete radar system would also include other data processing circuitry (not shown) which would also require testing. Nonetheless, a brief description of the illustrative receiver/exciter system 10 will illustrate the need for the system of the present invention.

As shown in FIG 1, the receiver/exciter 10 includes a radio frequency (RF) electronics module 12, an intermediate frequency (IF) electronics module 14, a reference oscillator module 16, a local generator module 18, an RF processor module 20, and a transmitter driver module 22. The RF electronics module 12, the IF electronics module 14 and the associated circuit components provide the receiver portion of the receiver/exciter 10. The reference oscillator module 16, the local generator module 18, the RF processor module 20 and the transmitter driver module 22 provide the exciter of the system 10.

In the receiver portion, first and second attenuators 24 and 26 are disposed at the front end of the RF electronics module 12. The first and second attenuators 24 and 26 attenuate signals received from first and second radar antennas 28 and 30 respectively in accordance with automatic gain compensation signals (AGC) input thereto. Signals from the first and second radar antennas 28 and 30 are provided by way of additional receiver circuits not shown. The output of the first attenuator 24 is input to the RF electronics module 12 through a circulator 32. The circulator 32 has a load 34. The output of the circulator 32 and the output of the second attenuator 26 are input to first and second field effect transistor (FET) amplifiers 36 and 38 respectively. An RF detector 40 is coupled to the first PET 36. The outputs of the FETs 36 and 38 are fed through first and second image rejection circuits 42 and 44, respectively, to balanced mixers 50 and 52. A power divider 54 splits a reference signal input between the balanced mixers 50 and 52. The outputs of the balanced mixers 50 and 52 are input to buffer amplifiers 56 and 58 respectively. The outputs of the buffer amplifiers 56 and 58 are input to third and fourth attenuators 60 and 62, respectively. The outputs of the third and fourth attenuators 60 and 62 are input to first and second bandpass filters 64 and 66, respectively. The outputs of the first and second bandpass filters 64 and 66 are amplified by buffer amplifiers 68 and 70, respectively, and input to first and second mixers 72 and 74 of the IF electronics module 14. Thus, the RF electronics module serves to downconvert the received radar signals and preprocesses in accordance with a chosen transmission/reception scheme the signals to provide signals of appropriate level to the IF processor module 14.

In addition to the first and second mixers 72 and 74, the IF processor 14 includes a power divider 76 which splits a signal therebetween from a reference signal circuit including a reference crystal oscillator 102, a gate 104 which receives a radar blanking signal from a radar signal processor (not shown) and an enable signal from a signal conditioning circuit 112 through an OR gate 114, and several multipliers 106, 108, and 110. The outputs of the mixers 72 and 74 are input to fifth and sixth buffer amplifiers 78 and 80 respectively. The output of the fifth buffer amplifier 78 is fed back to the first mixer via an IF detector circuit 82. In addition, the outputs of the fifth and sixth buffer amplifiers 78 and 80 are switched by first and second switches 84 and 86 to a filter selected 9 Mhz or 57 Mhz bandpass filter as selected from a first set of filters 88 and a second set of filters 90, respectively, by a power control circuit 116 and fed by another set o switches 92 and 94 to seventh and eighth buffer amplifiers 96 and 96. A combiner electronics circuit 100 combines the I and Q quadrature signals to provide sum Σ and difference Δ radar signals to the radar signal conditioning circuit 112. The signal conditioning circuit 112 provides a plurality of output signals including radar data to an analog signal converter (not shown), built-in test (BIT) to a power control circuit 116, a radar blanking enable to the OR gate 114 and gate, clock and phase control signals to an alignment electronics circuit of the transmitter driver module 22.

As mentioned above, the RF electronics module 12, the IF electronics module 14 and the associated circuit components provide the receiver portion of the receiver/exciter 10. The reference oscillator module 16, the local generator module 18, the RF processor module 20 and the transmitter driver module 22 provide the exciter of the system 10.

The reference oscillator module 16 includes a reference oscillator 118 which provides a first input to a phase comparator 120. A second input to the phase comparator 120 is provided by the voltage controller oscillator (VCO) 126. The output of the phase comparator 120 is input to a phase locked loop electronics circuit 122. A harmonic detector 124 feeds a detected RF signal to the phase locked loop circuit 122. The output of the phase locked loop electronics circuit 122 is input to the voltage controlled oscillator 126. The output of the voltage controlled oscillator 126 is input to the local generator module 18.

The local generator upconverts the signal provided by the reference oscillator module 16. The local generator module 18 includes a mixer 128 which receives the signal from the voltage controlled oscillator 126 of the reference oscillator module 16. A second input to the mixer 128 is provided by a second voltage controlled oscillator 130. The output of the mixer 128 is input to a discriminator (DISC) 132 and a divide by 4 circuit 136. The output of the discriminator 132 is input to an automatic frequency control (AFC) 134 along with frequency agility (FA) CLOCK and noncoherent frequency agility (NCTA) signals from the controller 116. Two crystal oscillators 140 and 142 second input to the phase comparator 138. The output of the phase comparator 138 is input to a second phase locked loop circuit 144. The output of the phase locked loop circuit 144 and the output of the AFC electronics circuit 134 are input to the second voltage controlled oscillator circuit 130. The output of the second voltage controlled oscillator circuit 130 is input to the RF processor module 20.

The RF processor module 20 encodes the RF signal in accordance with a desired radar signal transmission scheme. The RF processor module 20 includes a multiplier 146 which provides input to two FET amplifiers 150 and 152 through a power divider 148. The output of the first FET amplifier 150 is input to the power divider 54 of the RF electronics module 12 and to a target simulation test circuit used for built-in-test. The second FET provides a signal to a bandpass filter 164 of the transmitter driver module 22.

The transmitter driver module 22 provides additional signal encoding. The transmitter driver module 22 includes a mixer 166 which receives the filtered signal from the bandpass filter 164 and a signal from the reference crystal oscillator 102 of the IF electronics module 14 through a divider 168, a first multiplier 170, a gate 172, and a second multiplier 174. The output of the mixer 166 is input to a second bandpass filter 176. The output of the second bandpass filter 176 is gated by a gating circuit 178 under control of the signal conditioning circuit 112 via alignment electronics circuit 182. The alignment electronics circuit 182 also controls the gating of the first gate 172 and a phase modulator circuit 180. The phase modulator circuit 180 receives input from the second gating circuit 178 and feeds an output signal back to the RF processor module 20.

A switch transistor 156 in the RF processor module 20 receives the signal fed back from the phase modulator 180 and feeds it to a transmitter driver/amplifier (not shown) via an FET amplifier 158. The output of the FET amplifier 158 is coupled to a detector 154. An attenuator 160 also receives input from switch 156 an input to a power divider 162. The power divider 162 splits the input signal into two BIT antenna signals for testing purposes.

Thus, a portion of an illustrative radar system is described with several modules each of which must be tested extensively. In accordance with a prior art testing scheme, a custom designed test set would be attached to each module at an appropriate section of the circuit for various tests. For example, in the RF electronics module 12, one would typically conduct analog tests for gain and for proper operation of the attenuation controls, proper operation of the filters, adjacent signal discrimination, and etc. In the IF electronics module 14, numerous tests are conducted in the analog and digital domains for downconversion and for several controls. In the transmitter driver module 22, numerous tests are conducted in the digital domain for primarily timing parameters. In the RF processor 20, tests are typically conducted that are similar to those conducted on the RF electronics module with the exceptions that the tests are conducted at higher power levels and more switching is involved. In the reference oscillator module 16 and the local generator module 18, signal purity and noise level tests may be conducted.

The need for a different custom designed test set to conduct each test on each module of each different radar system is addressed by the present invention which provides a versatile, reconfigurable automated radar system test set.

Figure 2:
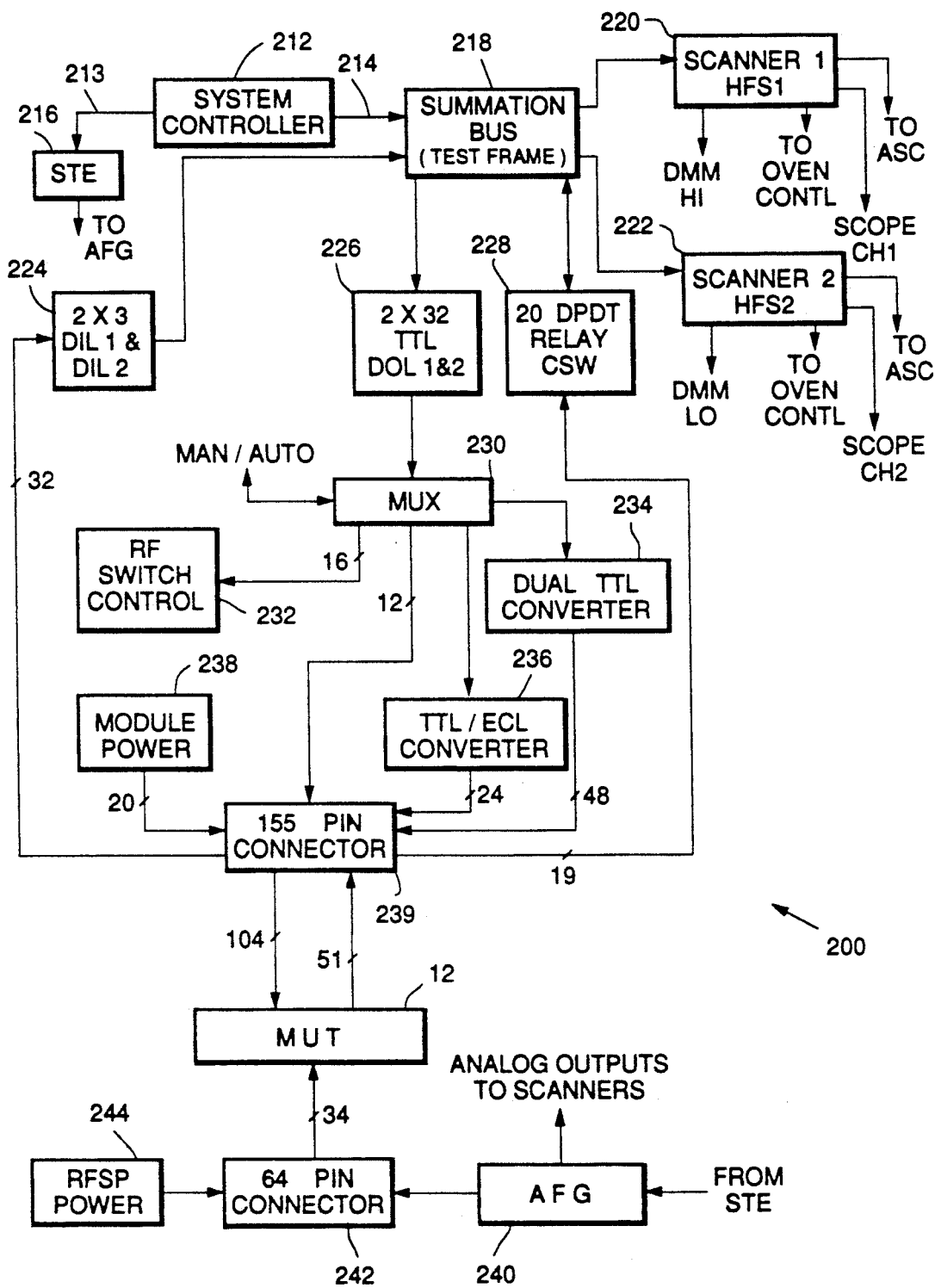
FIG. 2 is a block diagram of the automated radar test system of the present invention.

A block diagram illustrating the control signal flow of the automated radar testing system 200 of the invention is presented in FIG. 2. The system 200 includes a system controller 212 implemented with a microcomputer. The system controller runs a test program such as "Test Case" provided by the Summation Company, currently believed to be a subsidiary of Fluke. Those skilled in the art will appreciate that any suitable custom or commercial test program may be used for this purpose without departing from the scope of the present invention. The system controller 212 provides a plurality of digital control signals in accordance with a versatile, reconfigurable testing regime adapted for a module under test. The system controller 212 is connected to first and second IEEE busses 213 and 214. The first IEEE bus 213 is connected to special IEEE compatible test equipment including vector voltmeters, RF generators, IF generators, noise figure meters, an IEEE 488E, for example, and other such conventional test equipment devices. The output of the special test equipment 216 is provided to an arbitrary function generator 240 which is discussed more fully below.

The second IEEE bus 214 is connected to a summation bus or test frame 218. The summation bus 218 is an embedded controller controlled by the IEEE 488E, which controls the switching of RF switches (not shown) through transistor-transistor logic (TTL) output latches 226 and a multiplexer 230. The summation bus 218 controls static TTL digital output latch cards 226 which in turn control the multiplexer 230. The summation bus 218 is connected to first and second high frequency scanners 220 and 222 and an analog switch control circuit 228. The scanners 220 and 222 are high frequency scanners which control instruments such as a digital multimeter, an oscilloscope (both not shown), analog outputs from the arbitrary function generator 240, and analog outputs to the RF switch controller 232. The analog switch control circuit 228, consisting of a plurality of custom switch cards, allows for analog information from the module under test to be provided to the system controller 212 under digital control. Additional input is provided to the summation bus 218 by a set of digital input latches 224. The summation bus and the latch and switch cards are commercially available from, for example, the Summation Company. The RF switch control circuit 232 serves to control coaxial radio frequency switches and may be implemented with a TTL digital output latch card which is commercially available from Summation Corporation.

Provision is made for a front panel (not shown). Manual front panel controls are exchanged with the system 200 via one output path from the multiplexer 230. In addition, the multiplexer 230 controls 12 TTL output lines to a module under test (MUT), which, for illustration, is the RF electronics module 12, via a 155 pin connector 239. Each module to be tested is equipped to provide interface/access to desired test points via first and second pin connectors 239 and 242. The multiplexer 230 provides input to a TTL/ECL (emitter-coupled logic) converter 236 which is also input to the MUT via the 155 pin connector 239. The multiplexer controls dual TTL signals used for certain tests via a dual TTL converter 234. Analog RF signals are applied to the module under test via an RF switch control device 232.

Input from the module under test 12 is provided to the system controller via digital input latches 224 and the summation bus 218. Power to module under test 12 is provided by a power module 238 via the pin connector 239. RF front panel power is provided to the module under test by a separate power source 244.

Thus, static (steady state) analog and digital control signals are provided to a module under test. Dynamic control signals are provided to the module under test by an arbitrary function generator (AFG) 240 such as the model 9109 sold by the LeCroy Corporation. The arbitrary function generator 240 provides a plurality of waveforms suitable for the various tests required for the module under test 12. The arbitrary function generator 240 is also connected to the system controller 212 to allow for signals generated in software to be downloaded to the AFG 240 and applied as a waveform to the unit under test 12. For example, the AFG 240 may provide 16 dual ECL signals and two clock signals to the module under test 12.

Thus, the present invention has been described herein with reference to a particular embodiment for a particular application. Those having ordinary skill in the art and access to the present teachings will recognize additional modifications applications and embodiments within the scope thereof.

It is therefore intended by the appended claims to cover any and all such applications, modifications and embodiments within the scope of the present invention.

Accordingly,

What is claimed is:

1. An automated radar test system comprising:
system control means for providing a plurality of digital control signals in accordance with a versatile, reconfigurable testing regime adapted for a module of said radar under test;
means for converting said digital control signals to static analog and digital test signals;
means responsive to said control means for generating a plurality of dynamic analog and digital rest signals; and
interfacing means for applying said static and dynamic analog and digital test signals to said module of said radar system.

2. The invention of claim 1 wherein said means for converting said digital signals to static test signals includes a multiplexer.

3. The invention of claim 2 wherein said means for converting said digital signals to static signals includes means for converting digital control signals to analog test signals.

4. The invention of claim 3 wherein said means for converting said digital signals to static signals includes means for switching analog signals in response to said digital control signals.

5. The invention of claim 4 including means for converting transistor-transistor logic signals to emitter-coupled logic signals.

6. The invention of claim 4 including a dual transistor-transistor logic converter.

7. The invention of claim 1 wherein said means for generating a plurality of dynamic analog and digital test signals includes an arbitrary function generator.

8. The invention of claim 7 wherein said means for converting said digital signals to static test signals includes a multiplexer.

9. The invention of claim 8 wherein said means for converting said digital signals to static signals includes means for converting digital control signals to analog test signals.

10. The invention of claim 9 wherein said means for converting said digital signals to static signals includes means for switching analog signals in response to said digital control signals.

11. The invention of claim 10 including means for converting transistor-transistor logic signals to emitter-coupled logic signals.

12. The invention of claim 10 including a dual transistor-transistor logic converter.

13. An automated radar test system comprising:
    system control means, including a microcomputer, for providing a plurality of digital control signals;
    means for converting said digital control signals to static analog and digital test signals, including:
    a multiplexer connected to said microcomputer,
    means connected to said multiplexer for converting digital control signals to analog test signals, and
    means for switching into a module under test said analog signals in response to said digital control signals;
    means for generating a plurality of dynamic analog and digital test signals including an arbitrary function generator; and
    means for applying said static and dynamic analog and digital test signals to said module under test.

14. A method for automatically testing a radar system including the steps of:
    providing a plurality of digital control signals;
    converting said digital control signals to static analog and digital test signals;
    generating a plurality of dynamic analog and digital test signals; and
    applying said static and dynamic analog and digital test signals to a module of a radar system under test.

* * * * *